(12) United States Patent
Boutaghou

(10) Patent No.: US 6,624,977 B1
(45) Date of Patent: Sep. 23, 2003

(54) DATA STORAGE SYSTEM WITH SLIDER HAVING VARIABLE HARDNESS PAD

(75) Inventor: Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 530 days.

(21) Appl. No.: 09/060,636

(22) Filed: Apr. 15, 1998

Related U.S. Application Data

(60) Provisional application No. 60/061,278, filed on Oct. 7, 1997.

(51) Int. Cl.[7] .............................. G11B 5/60; G11B 21/21
(52) U.S. Cl. .................................. 360/235.2; 360/235.8
(58) Field of Search .............................. 360/102, 103, 360/235.1, 235.2, 235.4, 235.5, 235.8, 236.3, 236.6, 237

(56) References Cited

U.S. PATENT DOCUMENTS

| | | | | |
|---|---|---|---|---|
| 3,919,717 A | * | 11/1975 | Cullen et al. ............... | 360/122 |
| 5,159,508 A | * | 10/1992 | Grill et al. ................... | 360/103 |
| 5,175,658 A | * | 12/1992 | Chang et al. ............... | 360/103 |
| 5,285,337 A | * | 2/1994 | Best et al. .................... | 360/103 |
| 5,408,373 A | * | 4/1995 | Bajorek et al. ............. | 360/104 |
| 5,499,149 A | * | 3/1996 | Dovek ......................... | 360/103 |
| 5,550,691 A | * | 8/1996 | Hamilton ..................... | 360/103 |
| 5,734,519 A | * | 3/1998 | Fontana, Jr. et al. ..... | 360/97.01 |
| 5,841,608 A | * | 11/1998 | Kasamatsu et al. ......... | 360/103 |
| 5,864,452 A | * | 1/1999 | Hirano et al. ............... | 360/103 |

FOREIGN PATENT DOCUMENTS

| | | | | |
|---|---|---|---|---|
| JP | 62-9574 | * | 1/1987 | ................ 360/103 |
| JP | 01-258218 | * | 10/1989 | |
| JP | 3-63978 | * | 3/1991 | ................ 360/103 |
| JP | 7-6538 | * | 1/1995 | |
| JP | 8-212740 | * | 8/1996 | |

* cited by examiner

*Primary Examiner*—David L. Ometz
(74) *Attorney, Agent, or Firm*—Westman, Champlin & Kelly, P.A.

(57) ABSTRACT

A slider having feet for elevating the slider above the disc surface for contact starts and stops ("CSS"). The feet are formed of variable-hardness structure to provide desired wear resistance and limit damage to the disc surface via contact of the slider with the disc surface.

25 Claims, 5 Drawing Sheets

DATA STORAGE SYSTEM WITH SLIDER HAVING VARIABLE HARDNESS PAD

The present invention claims priority to Provisional Application Ser. No. 60/061,278, filed Oct. 7, 1997, entitled "VARIABLE DLC PAD HARDNESS FOR IMPROVED TRIBOLOBY PERFORMANCE."

BACKGROUND OF THE INVENTION

The present invention relates to data storage systems. More specifically, the present invention relates to an improved construction for sliders for supporting transducer elements for proximity recording.

Sliders support transducer elements and include an air bearing surface which supports the transducer elements above the disc surface for read and write operations. Sliders take off and land from a landing zone on the disc surface for contact starts and stops ("CSS"). For operation, rotation of the disc provides airflow to the air bearing surface of the slider to raise the slider from the landing zone to fly above the disc surface for operation. Sliders are coupled to an actuator block to position the sliders relative to selected data tracks on the disc surface for read/write operations.

Stiction between the slider and the surface of the landing zone affects "takeoff" of the slider from the disc surface. In some slider designs, the air bearing surface can include feet extending therefrom to support the air bearing surface above the disc surface, to reduce stiction. The contact surface area of the feet and disc is sized smaller than the air bearing surface to reduce stiction and takeoff velocity. Feet may be formed of a relatively hard material to reduce wear caused by contact with the disc surface for long-term operation of the disc drive.

There is better read/write resolution between the transducers supported by the slider and the disc surface at lower slider fly heights. Thus, it is important to provide lower slider fly heights since recording density is increasing. However, lower fly heights may cause interference with the feet and the disc surface. Although feet formed of a hard material provide extended wear resistance, prolonged contact between the feet and the disc surface may damage the disc surface, thus degrading operation performance of the disc drive.

SUMMARY OF THE INVENTION

The present invention relates to a slider having feet for elevating the slider above the disc surface for contact starts and stops. The feet of the present invention are formed of a structure having variable hardness for wear resistance and improved operating performance. The variable-hardness feet provide desired wear resistance and limit damage to the disc surface caused by contact of the slider with the disc surface.

DETAILED DESCRIPTION OF THE PREFERRED EMBODIMENTS

Figure 1:
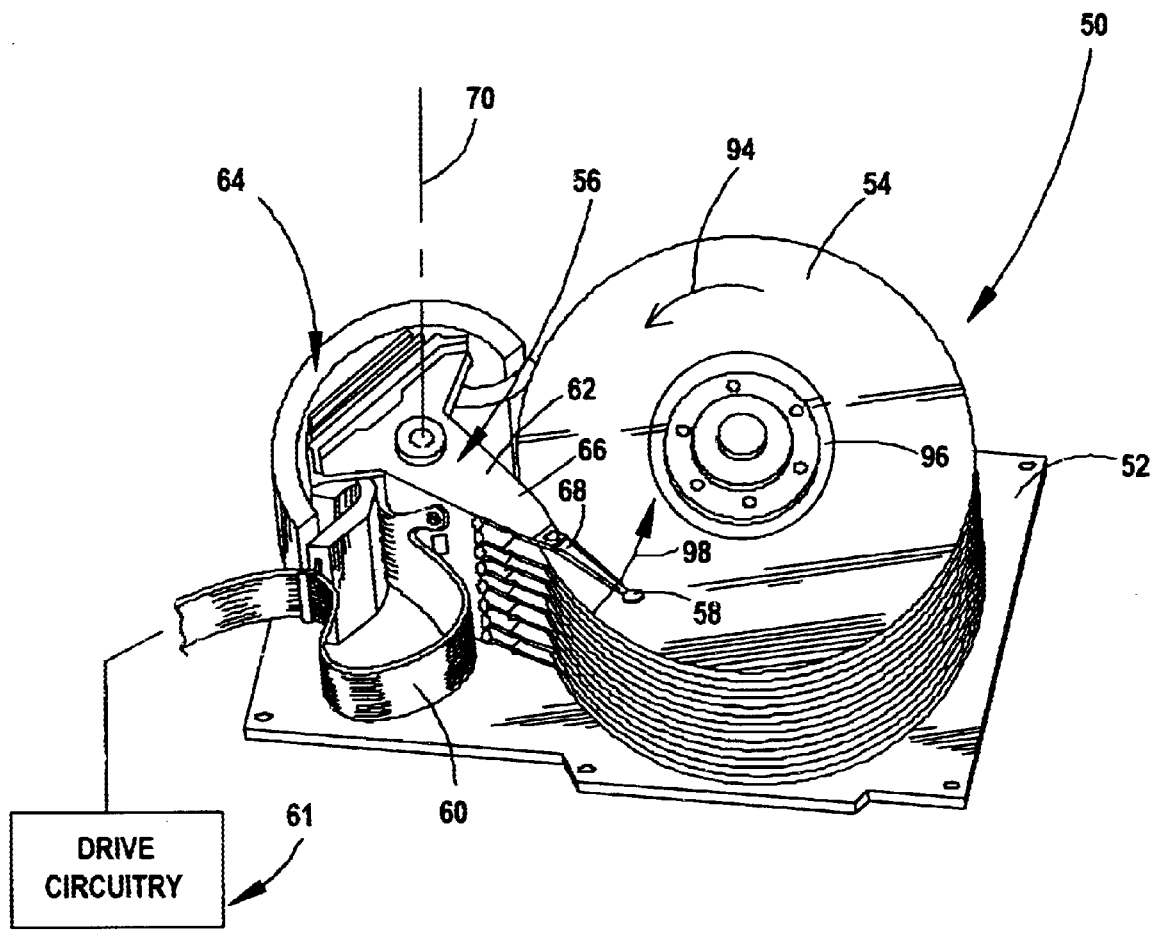
FIG. 1 is an illustrative view of a disc drive.

The present invention relates to a data storage system and, in particular, has applications to a disc drive 50 for storing digital information as shown in FIG. 1. As shown, disc drive 50 includes a base 52, a disc stack 54, and a rotary actuator 56. The rotary actuator 56 supports heads 58 relative to surfaces of discs of disc stack 54, to read and write information to and from the disc. Heads 58 are coupled to a flex circuit 60, which is coupled to circuitry 61 of the disc drive for read and write operations.

In particular, rotary actuator 56 includes an actuator block 62 and a voice coil motor 64 for movement. Heads 58 are supported relative to actuator block 62 via a plurality of stacked actuator arms 66. Heads 58 are coupled to actuator arm 66 via suspension assemblies 68 in a known manner. Operation of the disc drive rotates actuator block 62 about an axis 70 for positioning heads 58 relative to selected data tracks on the discs via operation of voice coil motor 64 for read and write operations.

Figure 2:
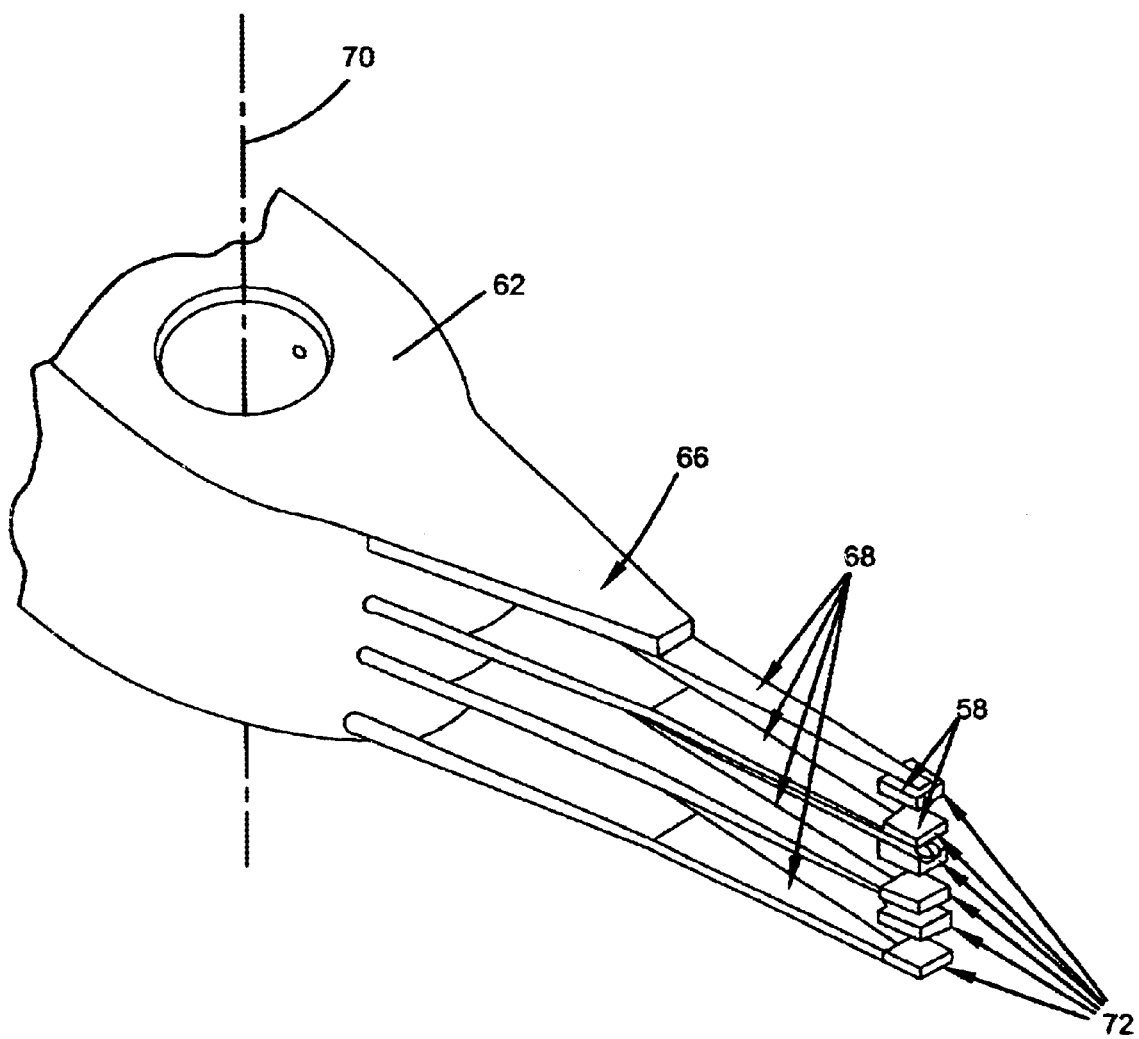
FIG. 2 is a perspective view of an actuator ("E-block") supporting disc heads for read and write operations.

FIG. 2 is a detailed perspective view of actuator block 62, which illustrates heads 58 supported via suspension assemblies 68 coupled to actuator arms 66. As shown, heads 58 include a slider 72, which supports the transducer elements for read and write operations. Slider 72 is flexibly coupled to actuator arms 66 via suspension assemblies 68 in a known manner.

Figure 3:
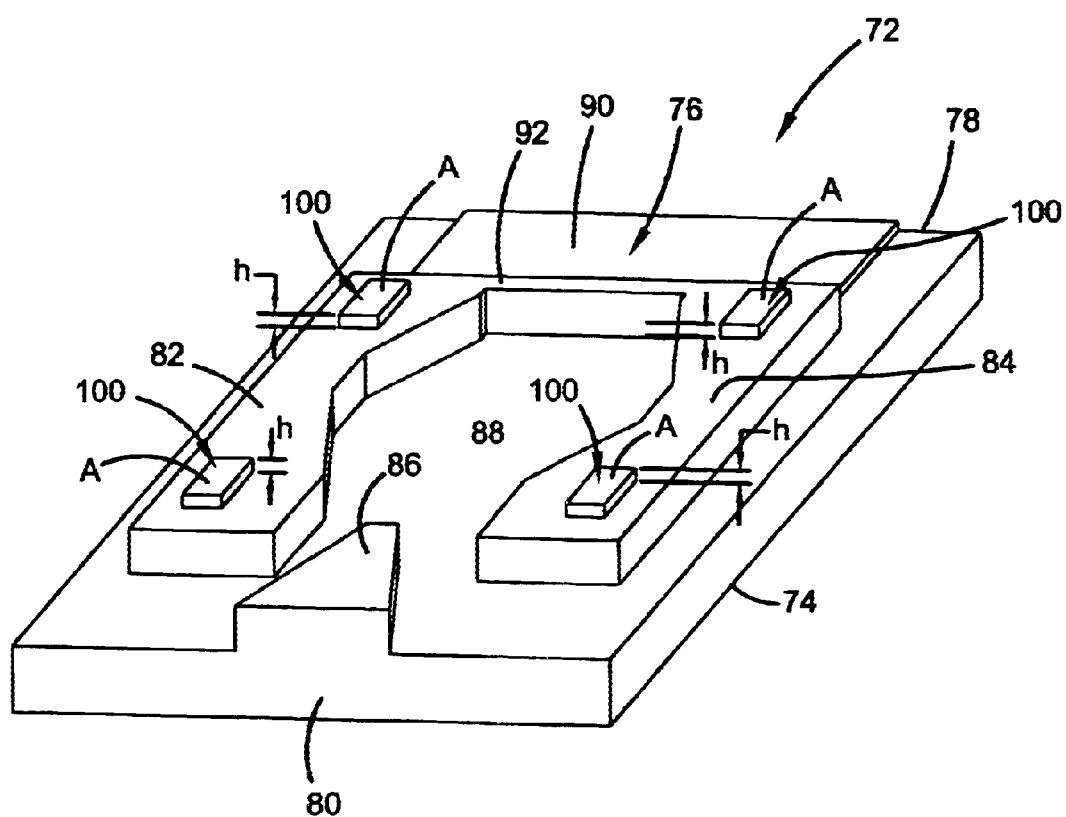
FIG. 3 is a perspective view of one embodiment of a slider of a disc head.

FIG. 3 is a perspective view of an embodiment of slider 72. As shown, slider 72 includes an upper surface 74, a lower air bearing 76, a leading edge 78 and a trailing edge 80. The lower air bearing 76 includes raised side rails 82, 84; and center rail 86 forming the air bearing surfaces. Cavity 88 is generally formed between rails 82, 84, 86 of the air bearing surfaces. Leading edge 76 may include a stepped cavity 90 recessed from the rails 82, 84, 86, which is elevated from cavity 88 for providing desired pressure for takeoff.

The air bearing may also include dam 92 between rails 82, 84 to form a subambient pressure cavity (i.e. cavity 88) for controlling slider fly height. Preferably, in the embodiment shown, transducers are formed on center rail 86. Transducers are formed on the trailing edge of the slider substrate via known thin film deposit techniques. Transducers may be inductive-type transducers or magnetoresistive transducers. Although a particular air bearing design is shown, the invention is not limited to the particular design shown.

Slider 72 is coupled to suspension assembly 68 at upper surface 74 of the slider so that the air bearing surface faces the disc surface. As the disc rotates (as illustrated by arrow 94 in FIG. 1), the disc pulls a very thin layer of air beneath the air bearing surface, which develops a lifting force that causes the slider to lift and fly several microinches above the disc surface. The slider 72 flies at a pitch angle, with leading edge 78 flying at a height higher than trailing edge 80. Air flows from leading edge 78 to the trailing edge 80. Skin friction on the air bearing surfaces causes air pressure to develop between the disc and the air bearing surface to provide lift to slider 72 to raise the slider to fly above the disc surface for proximity recording.

While the disc is not in operation, the head (and slider 72) park on the disc surface in the landing zone 96 illustrated in FIG. 1. For operation, actuator block 62 is operated along path 98, illustrated in FIG. 1, via operation of voice coil motor 64 to position heads 58 relative to selected data tracks for read and write operations. After operation ceases, actuator block 62 rotates about axis 70 to position heads 58 in landing zone 96. Thereafter, disc rotation ceases and slider 72 lift decreases so that the slider parks or lands on landing zone 96 of the disc surface for contact starts and stops.

The embodiment of the slider of the present invention includes feet 100 extending from rails 82, 84 of the air bearing to contact the disc surface for contact starts and stops. The lifting force of slider 72 from the disc surface is a function of the tangential velocity component of the disc rotation. In order to lift the slider to fly above the disc surface, disc rotation must create sufficient lift to overcome stiction between the slider and the disc surface. Slider designs may include feet to reduce the contact interface between the slider and disc surface. The reduced contact interface between the slider and the disc surface reduces stiction. Sliders may also include feet to elevate the slider for facilitating airflow under the air bearing surface for desired takeoff operation.

Feet may be formed of a relatively hard material, such as a diamond-like carbon, to protect the slider 72 and feet 100 from wear. Although feet constructed of a hard material protect the feet from wear, contact of the feet with the disc media may damage the disc and affect operating characteristics of the disc drive. When the feet are relatively hard in relation to the disc media or surface, contact of the feet on the disc surface may alter the surface characteristics of the disc, including the landing zone, thus affecting takeoff and operating parameters of slider 72.

Figure 4:
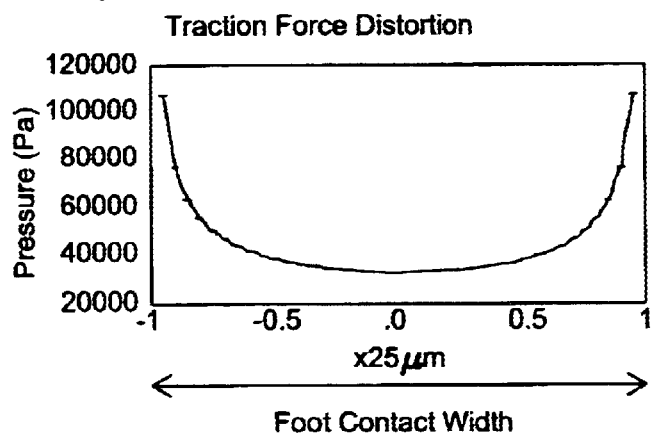
FIG. 4 illustrates a contact force profile for contact interface between the relatively hard feet and the disc surface.
Figure 5:
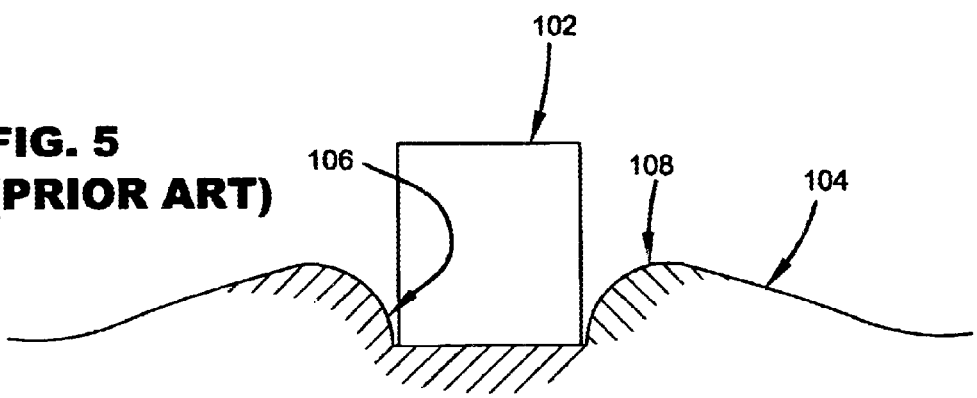
FIG. 5 is an illustrative view of contact of a foot of FIG. 4 (extending from a lower air bearing surface of the slider) with a disc surface.

During operation, slider 72 may contact or slam into the disc media due to vibration, shock, slider roll, or an uneven disc surface. FIG. 4 quantitatively illustrates the impact force along the width of a foot formed of a unitary hardness structure, supported on air bearing surfaces. As shown, the impact force of feet with the disc surface is significantly greater at the edges of the feet. As shown in FIG. 5, the relatively hard foot 102, formed of a unitary hardness, essentially punches and deforms the disc surface 104 at a contact interface at the edges of the foot. The contact interface of foot 102 and disc surface 104 forms a recessed portion (depression) 106 and a rim portion (ridge) 108 surrounding recessed portion 106 since, as illustrated, the impact force is significantly greater at the edges of the feet. Data stored to recessed portion 106 and rim portion 108 may be degraded, and fly characteristics at the contact area may be affected. Depending upon the fly height, the slider may contact the raised rim portion during subsequent operation, degrading performance of the disc drive.

Figure 6:
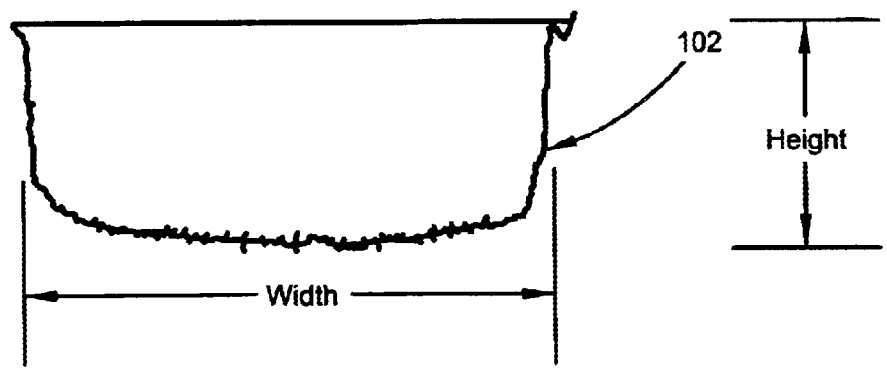
FIG. 6 is a profilometer trace of the wear profile of a foot similar to FIG. 4.

FIG. 6 is a Tencor trace of wear of feet 102. As illustrated in FIG. 6, edges of feet wear due to repeat contact with the disc surface after extended operation. Feet which are formed of a relatively soft material in comparison to the disc media may wear more rapidly, thus increasing contact stiction and affecting takeoff and operating characteristics.

Disc drive density is increasing; and, thus, it is desirable that sliders fly closer to the disc surface for better resolution between the transducers and the data bit locations on the disc. Lower fly heights increase the propensity for the, slider to contact the disc surface during operation due to vibration, shock, or disc asperities. Repeat contact with the disc surface may degrade data stored on the disc surface, as well as corrupt the disc surface, creating ridges and depressions which alter fly characteristics and increase the propensity of the slider to slam into the disc surface during flight.

Figure 7:
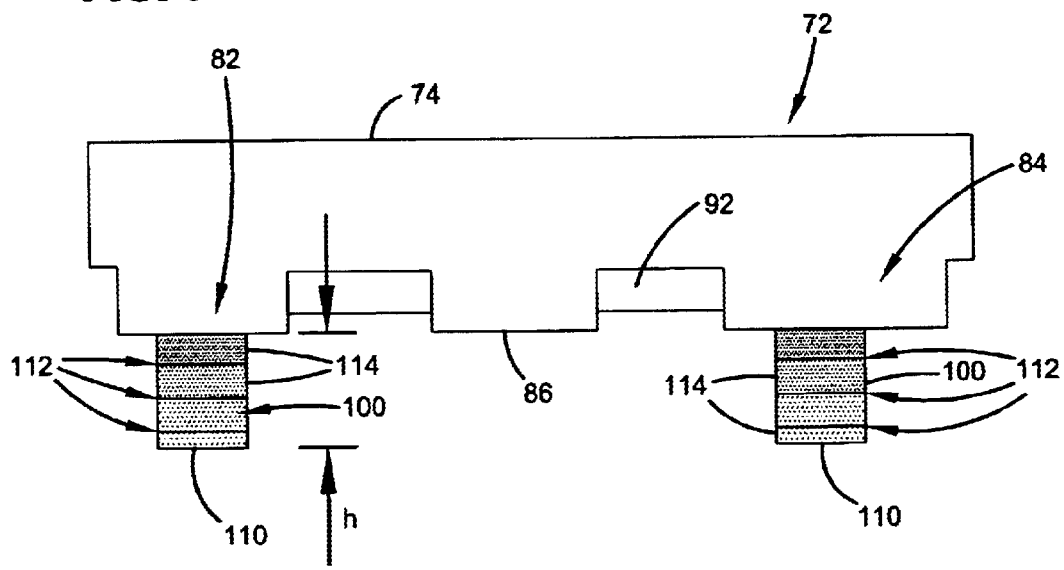
FIG. 7 is an elevational view of a slider facing a trailing edge, illustrating an embodiment of feet having a variable-hardness structure according to the present invention.

FIG. 7 is an elevational view of slider 72 including feet 100 formed of a variable-hardness structure. The hardness of the foot decreases as the foot extends from the bearing surface. Preferably, the height of the feet ranges between 2–3 microinches, and the area of each foot is 1000 microns$^2$. The hardness of the feet preferably varies between 20–40 Gigapascals from the air bearing surface to an extended elevation 110 of the foot. Feet may be formed of discrete layers of variable hardness, as illustrated by discrete lines 112, or may be formed of a continuous member having a continuum variation of hardness, illustrated by the various shade gradations 114.

An embodiment of slider 72 is formed of a conventional ceramic mixture of titanium carbide and alumina ($Al_2O_3$). The air bearing of the slider (rails and recesses) is formed by known etching or ion-milling techniques. Variable-hardness feet are formed on the air bearing surfaces. As previously explained, variable-hardness feet may be formed of discrete hardness layers (as illustrated by lines 112) or a member having a continuous variation of hardness. The variable-hardness layers are formed by varying the deposition parameters. Preferably, the deposit layers are formed of a diamond-like carbon. The diamond-like carbon is mixed with varied quantities of an additive component, such as hydrogen, to vary composition hardness of the diamond-like carbon.

In one embodiment, multiple discrete hardness layers may be deposited by known deposition techniques, such as sputtering techniques or ion beam deposition techniques. Discrete layers may be formed by step variation in the diamond-like carbon composition. In an example embodiment, feet may have two discrete hardness layers. The first layer adjacent the bearing surface may have a hardness between 30–40 Gigapascals, and the second exposed layer may have a hardness between 20–30 Gigapascals.

As previously explained, in another embodiment, feet may be formed of an extension having a continuum variation of hardness varying along the height of the extension. The varied hardness is achieved by continuously varying the composition of the diamond-like carbon deposited by varying, for example, the hydrogen content as a function of time. A higher hydrogen content reduces the hardness of the diamond-like carbon. Thus, initially, material deposited has a lower concentration of hydrogen to provide relatively hard portions proximate to the bearing, and the concentration progressively increases with time so that the feet are increasingly softer as the feet extend away from the bearing surface.

Feet 100 are formed by known masking techniques to form the desired size and shape of feet 100. Although rectangular-shaped feet are shown, it should be understood that the invention is not limited to the size, shape, or number of feet shown; and also that the slider 72 may include any number of feet. Alternate wear-resistant materials may be used, such as titanium carbide; and the invention is not limited to any particular wear-resistant material.

Figure 8:
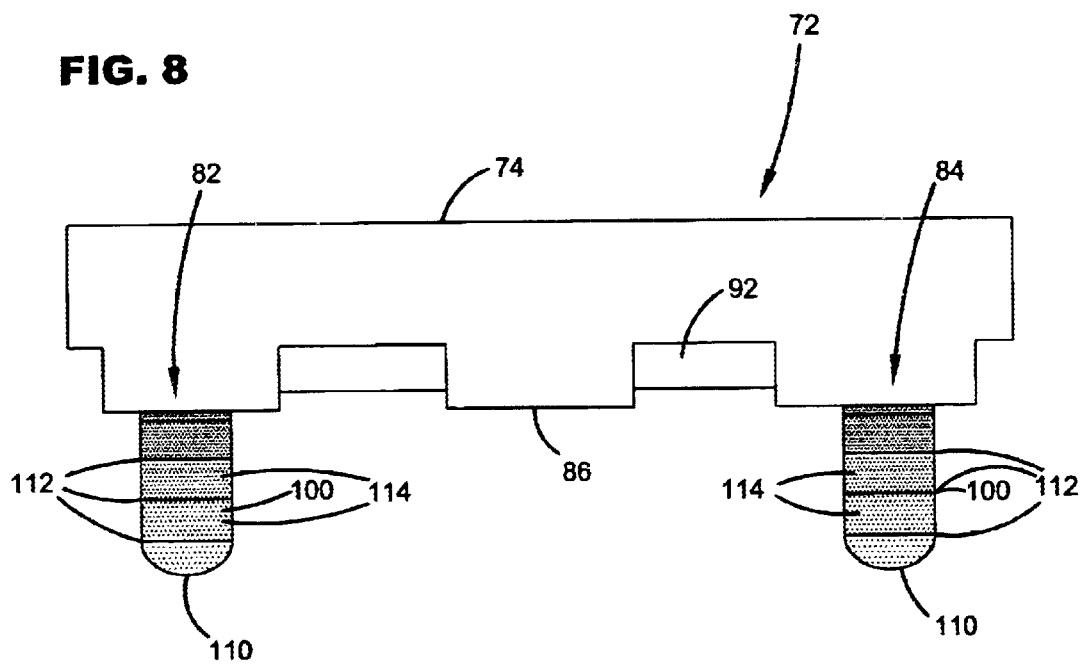
FIG. 8 is a view similar to FIG. 7 illustrating the profile of the variable-hardness foot construction worn after use.

FIG. 8 illustrates a slider 72 constructed as illustrated in FIG. 7, after feet 100 have been worn in from use. As shown, feet 100 are worn such that the elevation 110 of foot 100 has been deformed or shaped to a relatively curve-shaped configuration so that the contact interface between the feet 100 and the disc surface media does not cause large deformations or surface irregularities to the disc surface, thus degrading data recording and retrieval, as well as subsequent fly characteristics of the slider. Since the feet 100 contain relatively hard layers or portions, desired foot performance is maintained to reduce stiction and elevate the slider for desired takeoff.

Although the present invention has been described with reference to preferred embodiments, workers skilled in the art will recognize that changes may be made in form and detail without departing from the spirit and scope of the invention.

What is claimed is:

1. A data storage system comprising:

a storage medium having a data surface;

a transducer element; and a slider carrying the transducer element and supported relative to the storage medium, the slider including a bearing surface facing the data surface for positioning the transducer element proximate the data surface during operation, the slider including at least one foot extending from the bearing surface in a direction toward the data surface and the at least one foot having a hardness which progressively varies as a function of a distance from the bearing surface.

2. The data storage system of claim 1 wherein the at least one foot is relatively more hard near the bearing surface and relatively less hard near the data surface.

3. The data storage system of claim 1 wherein the at least one foot has a plurality of discrete layers of varied hardness.

4. The data storage system of claim 1 wherein the at least one foot comprises diamond-like carbon.

5. The slider of claim 4 wherein the diamond like carbon includes a variable hardness as a function of the distance from the bearing surface.

6. The data storage system of claim 1 wherein the at least one foot includes a plurality of feet extending from the bearing surface, the plurality of feet having a variable hardness as a function of the distance from the bearing surface.

7. The data storage system of claim 1 wherein the at least one foot is formed by a material deposition technique.

8. The data storage system of claim 1 wherein the at least one foot includes feet extending from the bearing surface on opposed sides of a trailing edge of the slider.

9. The data storage system of claim 1 wherein the at least one foot includes feet extending from the bearing surface on opposed sides of a leading edge of the slider.

10. A slider adapted to support a transducer element relative to a data surface of a disc drive, comprising:

a bearing having a bearing surface for operating the slider for proximity recording, said slider including at least one foot extending from the bearing surface, the at least one foot being formed of a diamond-like carbon having a variable hardness along a height of the at least one foot extending from the bearing surface.

11. The slider of claim 10 wherein the at least one foot includes a plurality of feet extending from the bearing surface.

12. The slider of claim 10 wherein the slider includes a leading edge, a trailing edge, and opposed sides; and wherein the at least one foot includes feet extending from the bearing surface proximate to the opposed sides and the leading edge of the slider.

13. The slider of claim 10 wherein the slider includes a leading edge, a trailing edge, and opposed sides; and wherein the at least one foot includes feet extending from the bearing surface proximate to the opposed sides and the trailing edge of the slider.

14. The slider of claim 10 wherein the at least one foot is relatively more hard near the bearing surface and relatively less hard near the data surface.

15. The slider of claim 10 wherein the at least one foot is formed via a deposition technique.

16. The slider of claim 10 wherein the variable hardness of the at least one foot continuously varies as a function of the height from the bearing surface.

17. The slider of claim 10 wherein the at least one foot includes discrete variable hardness layers.

18. A slider comprising:

a slider body including a bearing surface; and at least one foot extending from the bearing surface formed of a deposit having a hardness which varies as a function of a height of the deposit from the bearing surface to provide a variable hardness for the at least one foot.

19. The slider of claim 18 wherein a composition of the deposit is varied to provide the variable hardness for the deposit.

20. The slider of claim 19 wherein the variable hardness of the at least one foot decreases as a height of the at least one foot increases from the air bearing.

21. The slider of claim 18 wherein the deposit is a diamond-like carbon having a variable hydrogen content.

22. A method of fabricating a slider comprising steps of:

forming an air bearing on a slider body; and forming a variable hardness foot on the air bearing by varying a composition of a deposited material as a function of time.

23. The method of claim 22 wherein the deposited material is a diamond like carbon.

24. The method of claim 23 wherein the composition of the diamond-like carbon is varied by varying a hydrogen content.

25. The method of claim 22 wherein the composition of the deposited material is varied to decrease hardness as a function time.

* * * * *

UNITED STATES PATENT AND TRADEMARK OFFICE
CERTIFICATE OF CORRECTION

PATENT NO. : 6,624,977 B1
DATED : September 23, 2003
INVENTOR(S) : Zine-Eddine Boutaghou It is certified that error appears in the above-identified patent and that said Letters Patent is hereby corrected as shown below:

<u>Column 6,</u>
Line 25, change "a bearing" to -- an air bearing --.
Lines 26 and 28, insert -- air -- before "bearing".
Line 36, insert -- surface -- after "bearing".
Line 51, insert -- of -- after "function".

Signed and Sealed this

Twenty-fifth Day of May, 2004

JON W. DUDAS
*Acting Director of the United States Patent and Trademark Office*